Dec. 4, 1951  F. J. LEE  2,577,687
WEED KILLER

Filed Dec. 5, 1949  2 SHEETS—SHEET 1

FRED J. LEE,
INVENTOR.

BY W. E. Beatty
ATTORNEY.

Dec. 4, 1951  F. J. LEE  2,577,687
WEED KILLER
Filed Dec. 5, 1949
2 SHEETS—SHEET 2
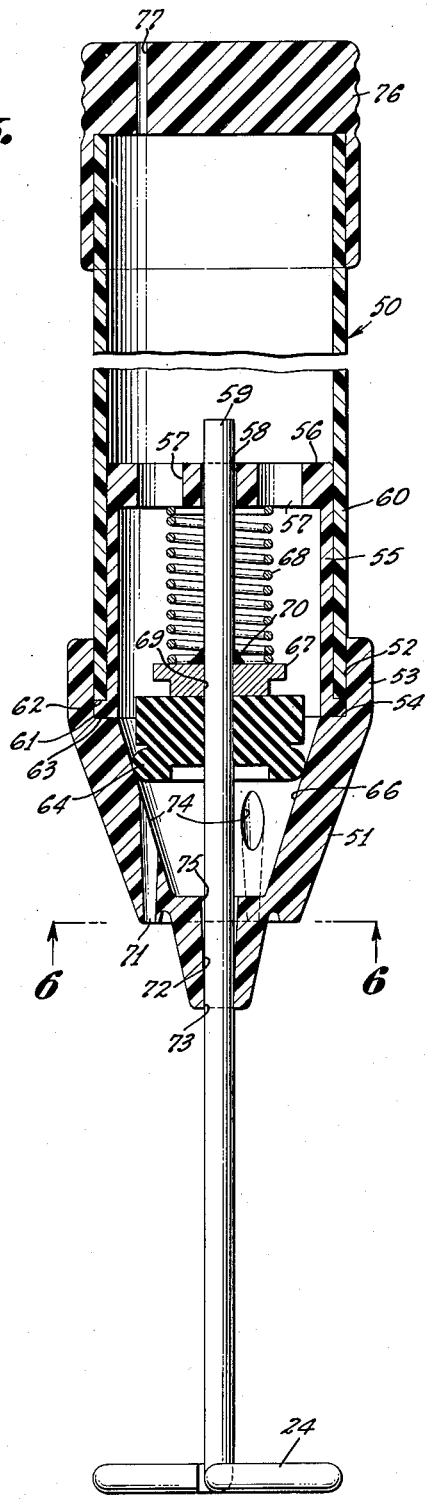
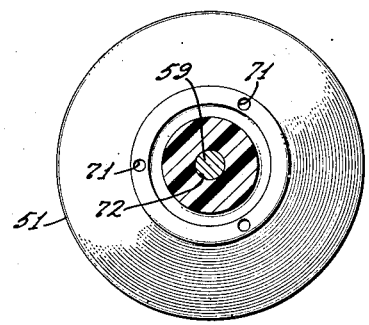
FRED J. LEE,
INVENTOR.
BY W E Beatty
ATTORNEY.

Patented Dec. 4, 1951

2,577,687

UNITED STATES PATENT OFFICE 2,577,687

WEED KILLER

Fred J. Lee, Pasadena, Calif.

Application December 5, 1949, Serial No. 131,237

2 Claims. (Cl. 222—322)

The invention relates to a weed killer and more particularly to a cane-like valve controlled container for dispensing a liquid suitable for killing weeds.

An object of the invention is to provide a valve controlled dispenser which is portable and having dimensions such that the operator may remain erect while holding the upper end of the device in the hand and with the lower end thereof engageable with the weed on the ground to operate the valve and guide fluid to the weed. A further object is to provide a valve controlled container suitable for the above purpose and wherein the device is operated by pushing the lower end of the device against a weed on the ground. A further object is to provide a valve controlled dispenser wherein the liquid contents of a container flow by gravity to a lower valve controlled port, with provisions for discharging only a small quantity of the fluid each time the valve is operated.

A further object is to provide valve arrangements in different forms which will direct flow of the liquid over the leaves of the weed, with or without also flowing to the center of the weed.

In one form of the invention, a constant flow is prevented when the device is fully operated, the dispenser serving, in effect, to deliver a measured quantity such as a teaspoonful of the liquid when the device is operated. In another form, the flow is continuous.

A further object of the invention is to provide valve controlled dispensers which are simple in construction and operation and wherein the container is of transparent material so that the amount of fluid therein is readily determined by inspection.

For further details of the invention reference is made to the drawings wherein

Fig. 5 is an enlarged longitudinal sectional view of a preferred form of the invention, with the casing broken away.

Fig. 6 is a sectional view on line 6—6 of Fig. 5.

Figure 1:
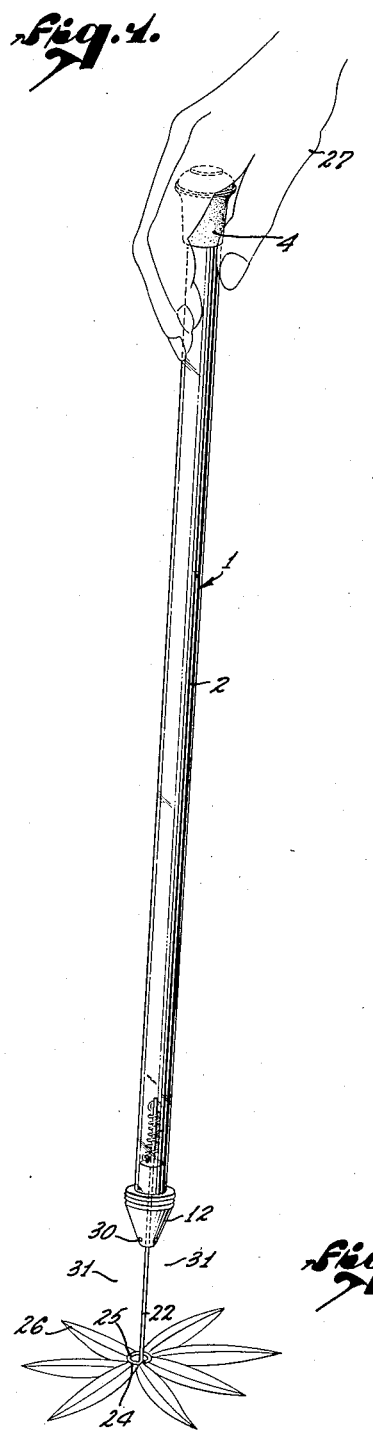
Fig. 1 is a perspective view of one form of a weed killer according to the present invention.
Figure 2:
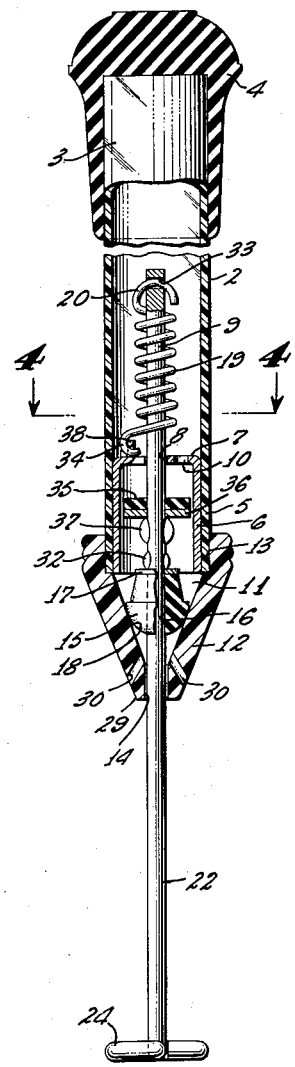
Fig. 2 is an enlarged sectional view of the device of Fig. 1 with parts broken away, showing the outlet valve in closed position.

Referring in detail to Figs. 1 to 4 of the drawings, the weed killer 1 comprises an elongated tubular cane-like casing 2 of transparent material such as plastic.

The upper end 3 of the casing 2 is removably closed by a rubber cap 4. Cap 4 may be removed to fill the casing 2 with any well known weed killer liquid.

Inserted in and suitably cemented to the lower end 5 of the casing 2 is a sleeve 6 of metal or other material. Sleeve 6 at its upper end has a wall 7 having a central guide aperture 8 for a wire 9 serving as a valve stem, and a plurality of other apertures 10 serving as ports for admitting the liquid in the container 2 into the interior of the sleeve 6 from which such liquid flows into the chamber 11 of a valve casing in the form of an inverted conical plastic member 12. The valve casing 12 at its upper end or base has a socket 13 in which the lower end of the tubular casing 2 is cemented or otherwise secured. The lower end or apex 29 of casing 12 has an aperture 14 through which the wire 9 passes, the aperture 14 being somewhat larger than the size of the wire 9 so that fluid will flow from chamber 11 and down the wire 9, when the valve 15 is operated. Preferably the lower end 29 of casing 12 is also provided with a plurality, such as four, ports indicated at 30, these ports slanting out in a downward direction so as, to also discharge some of the liquid in diverging streams indicated at 31 in Fig. 1 when valve 15 is operated.

The valve 15 is a spherical rubber device having a central aperture 16 into which the wire 9 is inserted. The valve 15 remains in position fixed to the wire 9 by friction, or suitable cement may be employed if desired. The inner end of valve 15 has a washer 17 which bears against an upset portion 32 on the wire 9 which serves as a stop to prevent inward movement. Valve 15 is urged to its closed position on conical seat 18 shown in Fig. 2 by a tension spring 19, having its upper end 20 suitably secured to the inner end of wire 9, for example, by extending through an aperture 33 therein, while its other end 34 is fixed to a lug 38 on the wall 7 of sleeve 6. Fixed to wire 9 is a rubber disk 35, serving as a valve to close the ports 10 when the valve 15 is opened. Valve 35 rests on a metal disk 36 prevented from outward movement along wire 9 by an upset portion 37 of the wire.

Valves 15 and 35 face in opposite directions and are fixed to wire 9 spaced apart a distance less than the distance between their respective seats, so that either of these valves can be closed when the other is open.

The wire 9 thus serves as a valve stem for the valve head 15 and valve 35. Wire 9 has an extension 22 and a lateral offset or foot piece 24, the offset 24 being bent in the form of a closed circle or other figure as indicated at 25 so as to provide a broad bearing surface or foot for application to a weed indicated at 26.

Preferably the distance from the cap 4 to the foot 24 which serves as a valve operator, is of the order of 35 inches, so that the operator may remain in an erect position while holding the cap 4 in the hand indicated at 27 in Fig. 1, with the foot 24 in contact with a weed 26 on the ground on which the operator is standing, indicated at 28. For example, the volume of the chamber 11 may be of the order of a teaspoonful so that only this amount of liquid will be discharged when the device is operated, constant flow from the container 2 being prevented if the user pushes down on the cap 4 sufficiently to close the valve 35 against the ports 10. This is the normal and preferred operation of the device although if, for some reason, the user should desire a continuous flow, this could be obtained by pushing down on the cap only a slight amount so that both the valves 35 and 15 are held open at the same time.

The weed killer 1 is operated by simply pressing down on the cap 4 with the foot 24 in contact with the weed 26, whereupon valve 15 is opened and valve 35 is preferably closed to allow a limited and measured quantity of liquid to run down the wire 9 and its extension 22, to the foot 24, and also flow out of the plurality of ports 30 onto the leaves of the weed 26. The flow can be stopped at any time by simply releasing the pressure on the cap 4 to allow spring 19 to close the valve 15. When valve 15 is moved to closed position, valve 35 moves to open position to allow liquid from the container 2 to pass through ports 10 into the chamber 11, ready for the next operation.

Figure 3:
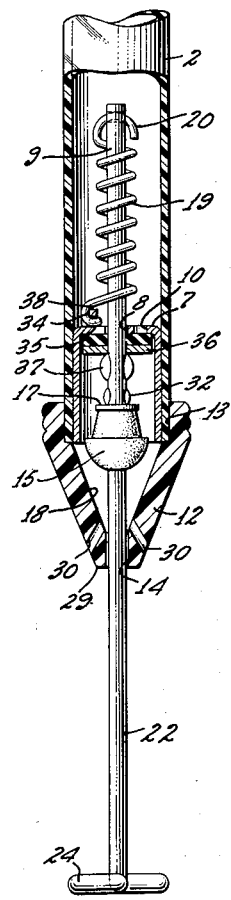
Fig. 3 is a sectional view corresponding to Fig. 2 showing the valves in position to deliver a measured quantity of fluid.
Figure 4:
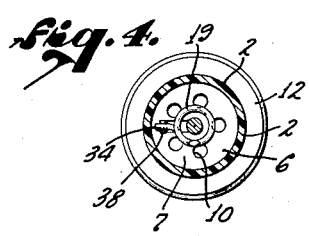
Fig. 4 is a sectional view on line 4—4 of Fig. 2.

On pushing down on the cap 27 to open valve 15, when the casing 2 is raised, valve 15 on being moved to closed position by spring 19, forces the liquid in front of it out of the ports 14, 30. The reason for this is that the diameter of the hemispherical head of valve 15, as measured crosswise of stem 9, is about four-fifths the diameter of its chamber when valve 15 is open as shown in Fig. 3, and when open, the head of valve 15 is about half way between inner port 10 and outer ports 14, 30, whereby valve 15 acts somewhat as a plunger in ejecting the liquid in front of it. Hence, if the user does not hold down on cap 4 until all the liquid in chamber 11 has run out, valve 15 pushes out a substantial part of such remainder.

In the preferred form of the invention shown in Fig. 5, the weed killer 50 is similar to the one shown in Figs. 1 to 4 except as follows. In this case, the valve casing 51 is a molding of plastic material having at its inner end a socket 52 having a cylindrical side wall 53 and an end wall 54. The insert 55 is also a molding of thermoplastic material having at its inner end a wall 56 having ports 57 and a bearing aperture 58 for the wire valve operator 59 as previously described. The insert 55 fits in the lower end of the transparent casing 60 and at its lower end has a flange 61 on which the lower end of casing 60 rests as indicated at 62. The flange 61 projects to the same diameter as the diameter of casing 60 and both thereof fit in the side wall 53, and the outer end 63 of the flange 61 fits against shoulder 54, the parts being suitably cemented together.

The rubber valve 64 has an annular semicircular bead at its lower end which serves as a valve face to contact the conical bore 66 of the valve casing 51. Valve head 61 is prevented from slipping upwardly on the operator 59 as it is backed by a metal disk 67 which serves as a spring retainer for the lower end of spring 68, the upper end of which bears against wall 56. The retainer 67 has a central aperture 69 through which the valve operator 59 passes, retainer 67 being soldered to operator 59 as indicated at 70.

Around the operator 59 and outwardly of the valve head 64 is arranged a plurality of discharge ports 71, three being shown. The outer end of valve casing 51 has a central aperture 72 to serve as a bearing for the operator 59 which slides snugly therein at the outer end of aperture 72 as indicated at 73 to prevent any substantial flow of liquid at this point and confine it to the ports 71. To permit the draft of the die, the ports 71 and the bearing aperture 72 are arranged on parallel axes and taper out in an inward direction as indicated at 74 and 75. The cap 76 is provided with a vent 77 to admit air when valve 64 is open, this vent not being necessary in the form shown in Figs. 1 to 4 as air leaks in around the operator 22 when the valve 15 is open.

The weed killers 1 and 50 have been constructed and tested and found to operate as above described and be quite satisfactory for the purpose. They are very easy to manipulate as the devices are light in weight, substantially less than one-half pound when empty, and it is a simple matter to hold the device like a cane and guide the foot 24 into contact with a weed and push on handle 4 or 76 while remaining erect and walking about the garden.

While a preferred use of the invention is for the purpose of killing weeds, other types of liquids may be used instead.

This application is a continuation in part of application Serial No. 107,400, filed July 29, 1949, for Weed Killer.

Various modifications may be made in the invention without departing from the spirit of the following claims.

I claim:

1. A liquid dispenser comprising a portable liquid container, said container at its lower end having a casing having a valve chamber, a downwardly closing valve for said valve chamber, spring means for urging said valve to closed position, said valve having an operator extending outwardly from said chamber, said chamber having a plurality of discharge ports controlled by said valve and arranged around said operator, said casing comprising a molding of plastic material, said casing having an outer end having a central bearing aperture for said operator, said bearing aperture and said ports tapering out in a direction inwardly of the lower end of said casing and said bearing aperture and said ports having parallel axes, said operator snugly fitting the outer end of said bearing aperture whereby flow from said chamber is mainly through said ports.

2. A liquid dispenser according to claim 1 wherein said casing is conical.

FRED J. LEE.

REFERENCES CITED

The following references are of record in the file of this patent:

UNITED STATES PATENTS

| Number | Name | Date |
|---|---|---|
| Re. 22,837 | Sanchis | Jan. 28, 1947 |
| 11,612 | Landmann | Aug. 29, 1854 |
| 241,561 | Parker | May 17, 1881 |
| 580,602 | Jacobs | Apr. 13, 1897 |
| 919,017 | Jackson | Apr. 20, 1909 |
| 1,260,334 | Cordley | Mar. 26, 1918 |
| 1,772,763 | Van Riper | Aug. 12, 1930 |
| 2,067,523 | Finney | Jan. 12, 1937 |
| 2,209,731 | Holmes | July 30, 1940 |
| 2,296,500 | Cain | Sept. 22, 1942 |
| 2,469,746 | Sanchis | May 10, 1949 |